United States Patent [19]

Fergason

[11] Patent Number: 5,412,500
[45] Date of Patent: May 2, 1995

[54] SYSTEM FOR CONTINUOUSLY ROTATING PLANE OF POLARIZED LIGHT AND APPARATUS USING THE SAME

[76] Inventor: James L. Fergason, 92 Adam Way, Atherton, Calif. 94025

[21] Appl. No.: 6,675

[22] Filed: Jan. 19, 1993

Related U.S. Application Data

[63] Continuation of Ser. No. 879,072, May 1, 1992, abandoned, which is a continuation of Ser. No. 707,296, May 28, 1991, abandoned, which is a continuation of Ser. No. 541,095, Jun. 20, 1990, abandoned, which is a continuation of Ser. No. 230,789, Aug. 10, 1988, abandoned.

[51] Int. Cl.$^6$ .............................................. G02F 1/03
[52] U.S. Cl. .................... 359/253; 359/73; 359/94; 359/246; 359/250; 359/251; 359/252
[58] Field of Search ............. 350/384, 389, 390, 391, 350/335, 347 R, 347 V, 347 E; 359/73, 93, 94, 246, 250, 251, 252, 253, 256

[56] References Cited

U.S. PATENT DOCUMENTS

| | | | |
|---|---|---|---|
| Re. 32,521 | 10/1987 | Fergason | 350/346 |
| 2,591,701 | 4/1952 | Jaffe | 350/389 |
| 3,239,671 | 3/1966 | Buhrer | 350/389 |
| 3,290,619 | 12/1966 | Geusic et al. | 350/390 |
| 3,423,686 | 1/1969 | Ballman et al. | 350/389 |
| 3,446,966 | 5/1969 | Peterson | 350/390 |
| 3,945,715 | 3/1976 | Drake | 350/389 |
| 4,385,806 | 5/1983 | Fergason | 350/347 R |
| 4,465,969 | 8/1984 | Tada et al. | 350/390 |
| 4,540,243 | 9/1985 | Fergason | 350/347 E |
| 4,541,691 | 9/1985 | Buzak | 350/335 |
| 4,583,825 | 4/1986 | Buzak | 350/335 |
| 4,674,841 | 6/1987 | Buzak | 350/347 R |

OTHER PUBLICATIONS

Crystals and the Polarising Microscope, Hartshorne and Stuart, 4th Edition, 1970, American Elsevier Publishing Company, Inc., New York, pp. 309–314.

*Primary Examiner*—Georgia Y. Epps
*Assistant Examiner*—Michael A. Papalas
*Attorney, Agent, or Firm*—Renner, Otto, Boisselle & Sklar

[57] ABSTRACT

Apparatus for rotating polarization of polarized light includes an input of linearly polarized light, a variable retarder for retarding the phase of one quadrature component of such linearly polarized input light an amount relative to the phase of the other quadrature component, and an analyzer for converting such quadrature components to linearly polarized light having a plane of polarization that is a function of the amount of such phase retardation. By changing the electrical input to the retarder the amount of rotation can be altered.

14 Claims, 3 Drawing Sheets

SYSTEM FOR CONTINUOUSLY ROTATING PLANE OF POLARIZED LIGHT AND APPARATUS USING THE SAME

This is a continuation of application Ser. No. 07/879,072 filed on May 1, 1992, now abandoned which is a file wrapper continuation application of Ser. No. 07/707,296, filed on May 28, 1991, now abandoned which is a file wrapper continuation of 07/541,095, filed on Jun. 20, 1990, now abandoned which is a file wrapper continuation of 07/230,789, filed Aug. 10, 1988, now abandoned.

TECHNICAL FIELD

The present invention relates generally, as is indicated, to systems for rotating the plane of polarized light, and, more particularly, to such a system that is capable of continuously rotating the plane of polarized light over selected angles, and to apparatus using the same.

BACKGROUND

When linearly polarized light (sometimes referred to as plane polarized light) is directed through an optically active crystal that exhibits double refraction, such crystal divides the incoming light into an ordinary ray and an extraordinary ray, which are vibrating in relatively orthogonal planes. Moreover, such optically active crystal tends to retard one of the rays relative to the other as they travel through the crystal thereby causing a phase difference between the two waves. The phase difference is a function of the thickness of the optically active crystal and of the wavelength of the light.

As is known, the general condition for polarized light is that of elliptical polarization. Linear polarization and circular polarization are special cases of elliptical polarization. For example, when linearly polarized light is directed through an optically active crystal that exhibits double refraction such that the axis of polarization and the axis of the crystal are at 45 degrees relative to each other and the thickness of the crystal is such that it retards one of the ordinary ray and extraordinary ray by an odd whole number multiple of 90 degrees (e.g., pi/2, 3pi/2, 5pi/2, etc.) relative to the other wave, for a particular wavelength of light, the output from the crystal will be circularly polarized light. To have circularly polarized light, the amplitude Ao of the ordinary ray and the amplitude Ae of the extraordinary ray must be equal and they must be out of phase by 90 degrees (or the mentioned odd whole number multiple thereof). This is the reason for the 45 degrees relation. In such case, the amplitudes Ao, Ae are defined, respectively, by $A(\sin \theta)$ and $A(\cos \theta)$, where A is the amplitude of the incident linearly polarized light to the crystal and $\theta$ (theta) is the angle of the vibrational plane of the electric vector of such incident light with respect to the optical axis of the crystal. When $\theta$ (theta) is 45 degrees, the sine and cosine functions mentioned are equal at 1, and the amplitudes, therefore, are equal.

However, if the amplitudes Ao and Ae mentioned above are not equal, whereby either the input angle $\theta$ (theta) is not 45 degrees and/or the retardation effected by the optically active crystal is not 90 degrees (or an odd whole number multiple thereof), then the more general case of elliptically polarized light occurs. As was mentioned above, the retardation effected by optically active crystal is a function of wavelength of the incident light.

The relationships of certain optical components for affecting light, particularly polarized light, is described, for example, in Jenkins and White FUNDAMENTALS OF OPTICS, McGraw-Hill Book Company, New York, 1957. For example, at Chapter 27 of such text, the interference of polarized light is described. Polarized light and use of various optical components with polarized light also are described elsewhere in such text. The entire disclosure of such text is incorporated herein by reference.

A liquid crystal device for phase modulating polarized light is disclosed in U.S. Pat. Nos. 4,385,806 4,436,376, 4,540,243, and U.S. Pat. No. Re. 32,521. The disclosures of such patents hereby are incorporated by reference. In such device linearly polarized light is phase-modulated as such light passes through a liquid crystal cell to which a modulated electrical carrier wave signal are applied as an electrical potential to develop an electric field across the liquid crystal material affecting alignment of the liquid crystal structure therein. The light which is transmitted through the liquid crystal cell is phase modulated as a function of the modulated electrical carrier wave signal. More specifically, the liquid crystal cell effectively separates the incident linearly polarized light into the quadrature components, i.e., the ordinary and extraordinary rays, thereof, and effects a retardation of one ray or component relative to the other as the light is transmitted through the cell. The amount of retardation, i.e., the effective optical thickness of the liquid crystal cell, is a function of the modulated electrical carrier wave signal. The liquid crystal cell disclosed in such patents utilizes a so-called surface mode switching technique which is fast acting, e.g., for example providing switching response times of as little to 10 to 100 microseconds.

BRIEF SUMMARY OF THE INVENTION

Briefly, the present invention relates to apparatus for rotating polarization (sometimes referred to as the direction of polarization or plane of polarization) of polarized light, including a source of linearly polarized input light or a means to effect linear polarization of input light, a variable retarder that retards the phase of one quadrature component of such linearly polarized input light an amount relative to the phase of the other quadrature component, and an analyzer that converts the quadrature components from the variable retarder to linearly polarized light that has a plane of polarization which is a function of the amount of such phase retardation.

According to a preferred embodiment, the variable retarder is a liquid crystal cell that operates according to surface mode alignment and switching characteristics in response to electric field input to alter the relative retardation or phase separation of the ordinary and extraordinary ray components of incident light. Such liquid crystal cell is disclosed in the aforementioned U.S. patents.

Another aspect of the invention relates to a method for rotating polarized light, including directing linearly polarized light to a variable retarder, adjusting the retarder to change the phase separation of the quadrature component of the light transmitted in the retarder, and recombining the quadrature components to produce linearly polarized light having a plane of polarization that is a function of such phase separation.

Further, an aspect of the invention relates to an apparatus for examining the optical activity of a specimen, including means to illuminate the specimen with polarized light and means to detect the effect of the specimen on the polarized light as an indication of the optical activity of the specimen. In a preferred embodiment, a photosensitive detector senses the light transmitted through the specimen, and an optical polarization system adjusts the relationship between the plane of polarization of the light incident on the specimen and the plane of polarization of the light received after having been transmitted through the specimen in order to cause either a maximum or minimum to be detected by the detector. Using the apparatus for rotating polarization of polarized light disclosed herein to effect such rotation, the electrical input to the variable retarder necessary to achieve the desired maximum or minimum condition will be representative of the optical activity of the specimen. Such optical activity, e.g., as a function of wavelength, may be used to identify a substance and/or the concentration of the substance.

These and other objects, advantages and features of the invention will become more apparent as the following detailed description proceeds. It will be appreciated, though, that the scope of the invention is to be determined by the scope of the claims and the equivalents thereof.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENT

Figure 1:
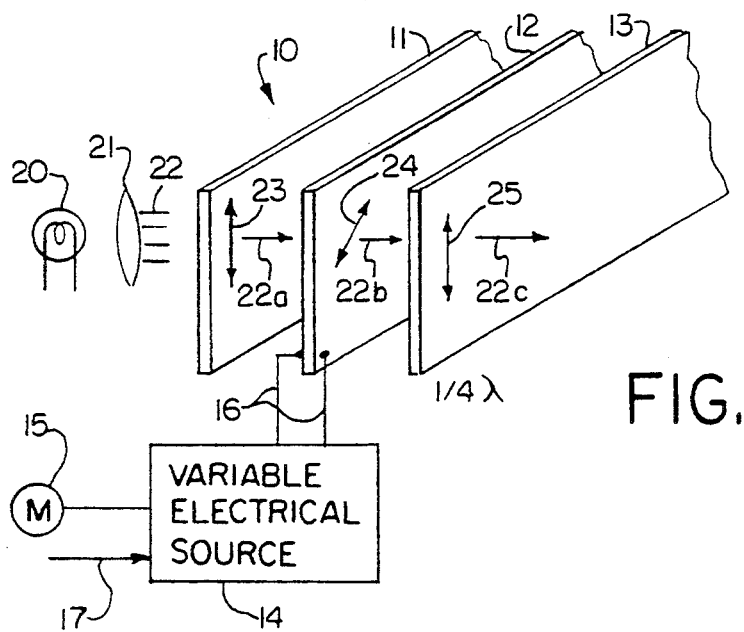
FIG. 1 is a schematic fragmentary view of an apparatus for rotating polarization of polarized light in accordance with the present invention.

Referring, now, in detail to the drawings wherein like reference numerals designate like parts in the several figures and initially to FIG. 1, an apparatus for rotating the polarization (sometimes referred to as direction of polarization or plane of polarization) of polarized light in accordance with the present invention is generally indicated at 10. The apparatus 10 includes a linear polarizer 11, a variable retarder 12, and an analyzing device 13, such as a quarter wave plate. The apparatus 10 also preferably includes a variable electrical source 14. Associated with the source 14 is a meter or indicator 15, for example, to indicate the voltage applied across the leads 16 to the variable retarder 12, and a conventional mechanism represented as an input 17 for adjusting the voltage of the source. The variable electrical source 14 may be of the type described in the above patents or some other type.

A light source 20 directs light to the apparatus 10. The light source 20 is illustrated as an incandescent source. However, in the preferred embodiment, such light source preferably is a monochromatic light source or is a scanning monochromatic light source able to produce light of selected wavelengths. Such monochromatic light sources are conventional. Another example of a monochromatic light source may be a laser. The light from the source 20 preferably is collimated for convenience, although collimation is not necessary to the invention. Collimation can be provided by means of a collimating lens 21 that directs the collimated light 22 incident on the linear polarizer 11.

The linear polarizer 11 may be a conventional linear polarizer that has an axis of polarization or plane of polarization identified by the arrow 23. The electric vector of the light 22a output from the linear polarizer 11 will be vibrating in the direction of the arrow 23. Such light is incident on the retarder 12.

The variable retarder 12 has an optical axis represented by the double-headed arrow 24. Preferably, such optical axis is oriented at 45 degrees relative to the axis 23 of the linear polarizer. Such retarder preferably is a liquid crystal device and has alignment characteristics of the liquid crystal that provides a constancy of optical axis with the X,Y plane (i.e., across the Z direction of propagation of light therethrough) although the alignment of the liquid crystal may change with respect to the Z direction. The variable retarder 12 is intended to operate on the quadrature components of the linearly polarized light 22a incident thereon so as to retard the phase of one quadrature component relative to the other. Such retarding is a function of the voltage applied by the source 14 to the retarder 12, as is described in further detail below and is described in detail in the above-mentioned U.S. patents. The light output 22b from the variable retarder 12 is composed of ordinary and extraordinary light rays that are out of phase with each other by an amount determined by the retarder 12. The extent that such quadrature components are out of phase determines the nature of the elliptical polarization of the light 22b.

If the phase retardation effected by the variable retarder 12 is 90 degrees or is an odd whole number multiple of 90 degrees (pi/2, 3pi/2, 5pi/2, etc.) then the light 22b will be circularly polarized because the above-described conditions of the 45 degree relationship of the incident linearly polarized light 22a and the optical axis 24 of the retarder 12 is met and the amplitudes of the ordinary and extraordinary rays will be equal. If the retardation is other than 90 degrees or an odd whole number multiple thereof, then the light 22b will be elliptically polarized, but not circularly polarized.

The quarter wave plate 13 has the optical axis 25 thereof oriented in parallel with the optical axis 23 of the linear polarizer 11 and at 45 degrees relative to the optical axis 24 of the variable retarder 12. The quarter wave plate 13 is intended to convert the elliptically (including circularly) polarized light 22b which is incident thereon to linearly polarized light 22c. The actual plane of polarization (in which the electric field vector vibrates) of the linearly polarized light 22c will be a function of the phase retardation characteristics (and, therefore, the elliptical polarization characteristics) of the light 22b, the optical thickness of the quarter wave plate 13, and the wavelength of the light 22b.

It is noted here that the effective optical thickness of each of the retarder 12 and the quarter wave plate 13 is a function of the actual thickness thereof, the wavelength of the light incident thereon and the respective ordinary index of refraction and extraordinary index of refraction characteristics thereof, as is well known.

If the retardation characteristics of the quarter wave plate 13 are such that for the wavelength of the light 22 from the source 20 a 90 degree phase retardation occurs in the quarter wave plate 13, then for circularly polarized light 22b, the quarter wave plate 13 will produce linearly polarized light 22c, and the plane of polarization will be parallel to the plane or axis of polarization 23 of the linear polarizer 11. On the other hand, for such wavelength of light, if the light 22b is elliptically polarized (but not circularly polarized), then the output from the quarter wave plate 13 will be linearly polarized, but the plane or axis of polarization will be different than the plane of polarization 23. Moreover, if the light 22b from the variable retarder 12 is circularly polarized, but the quarter wave plate 13 does not provide 90 degree phase retardation for the wavelength of the light 22b incident thereon, then the light 22c will be linearly polarized, but the plane of polarization thereof will not be parallel to the plane of polarization 23.

In view of the foregoing, it will be appreciated that as the variable electrical source 14 changes the voltage applied to the variable retarder 12, the plane of polarization of the light 22c output from the quarter wave plate 13 will be rotated a corresponding amount. Thus, as is described elsewhere herein, as the electrical unit may continuously vary, the plane of polarization of the light 22c is continuously rotated. The meter 15 may be used to indicate the voltage applied by the source 14 to the variable retarder 12 and in fact may be calibrated in the sense of angular rotation or position of the plane of polarization of the output light 22c from the quarter wave plate 13. The voltage applied by the source 14 may be varied as a function of an input 17 thereto. Such input 17 may be a manual adjustment, e.g., a variable potentiometer or other similar device, or such input may be an automatic or electronic one from another source, such as a computer, a feedback device, a servo system, etc.

Figure 2:
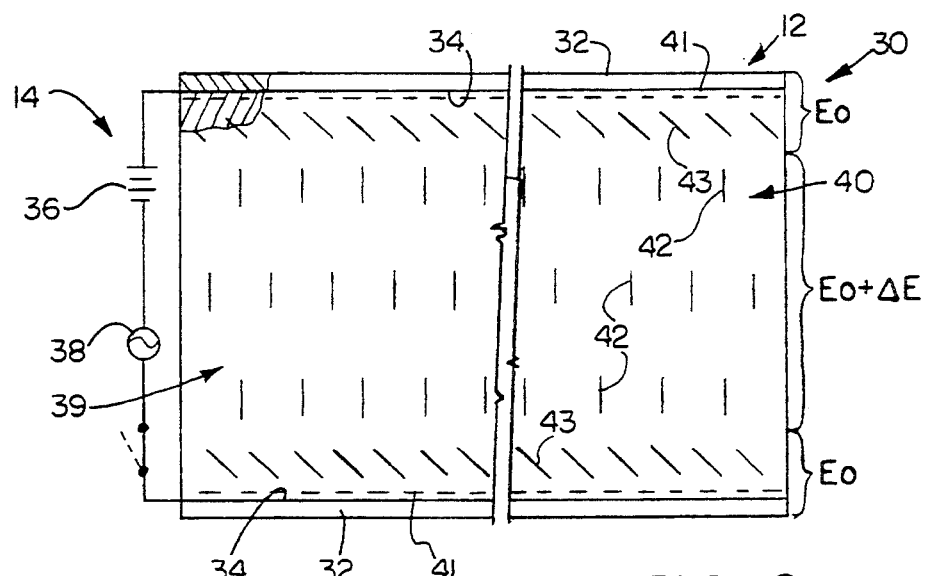
FIG. 2 is a schematic side elevation view of a liquid crystal cell serving as a variable retarder in accordance with the present invention.

Turning to FIG. 2, a liquid crystal cell 30, which may serve as the variable retarder 12, is schematically illustrated. The cell 30 includes a pair of optically transparent plates 32, for example of glass, which preferably are coated with transparent electrically conductive material 34 that serve as electrodes to apply electric field across the liquid crystal in the cell. The variable electrical source 14 is depicted as a fixed voltage, e.g., a DC or even AC, if desired, bias source 36 and an AC signal source 38. The source 38 produces a relatively high frequency signal, e.g., 10 Hz to 500 KHz. The sources 36, 38 are coupled in electrical series and are coupled across the conductive electrodes 34, for example in the manner illustrated. Conventional means may be provided to adjust, to increase or to decrease, the voltage of either or both of the sources 36, 38 and/or selectively to turn one or both on and off.

In the interior volume 39 of the cell 30 is liquid crystal generally designated 40. The liquid crystal preferably is nematic liquid crystal or at least operationally nematic liquid crystal, and such liquid crystal preferably has positive dielectric anisotropy and is birefringent. As is known, the structural organization, alignment, arrangement, etc., of the nematic liquid crystal tends to be linear, tends not to be arranged in layers, and tends to be influenced to a large extent by the structural orientation at the surface or boundary between the liquid crystal material and the medium or material containing the liquid crystal material in the absence of a prescribed input, such as an electric field. However, in the presence of an electric field if the liquid crystal has positive dielectric anisotropy the liquid crystal will tend to become aligned with respect to the field, e.g., in parallel with the field (or perpendicular to the field if the liquid crystal has negative dielectric anisotropy), and the extent of such alignment throughout the mass of liquid crystal material in the liquid crystal cell will be a function of the magnitude of the input and of the condition and energy at the boundaries.

In the liquid crystal cell 30, as is described in the above-mentioned U.S. patents, the surfaces of the plates 32 or electrodes 34 are rubbed or are otherwise treated, e.g., with the application of a material that subsequently is rubbed or is applied in a certain fashion, to achieve an orientation of the liquid crystal proximate those plates in a direction generally parallel to the plates or fairly close to parallel. That liquid crystal which is located near the plates 32 will present an optical axis to incident light generally transverse to the direction of the incident light so as to exhibit a desired birefringence and/or phase retardation effects mentioned above. That liquid crystal 40 which is proximate the plates 32 is designated by reference numeral 41 in FIG. 2. The parallel alignment of liquid crystal structure parallel to the surfaces of the plates 32 defines the optical axis of the cell 30 in the X,Y plane thereof, i.e. orthogonal to the Z direction of propagation of light through the cell.

The bias voltage source 36 is intended to provide adequate voltage and electric field across the liquid crystal 40 so as to cause alignment in parallel with the field of that liquid crystal 42, which is generally located in a center area of the liquid crystal cell 30 and is not directly adjacent or proximate the plates 32. As is described in the above patents, a larger voltage is required to cause alignment with respect to electric field for that liquid crystal which is proximate the plates 32 compared to the voltage required to effect alignment for that liquid crystal nearer the center of the cell, e.g., due to surface energy and boundary conditions. That liquid crystal 42 which is aligned with the applied field preferably essentially has the optical axis thereof in parallel with the direction of propagation of light therethrough so as to have no impact or, in any event, relatively little impact on the transmitted light, especially on the phase retardation characteristics of quadrature components of the transmitted light.

In the absence of a voltage applied by the source 38, that liquid crystal 43, which is between the liquid crystal 41, which is generally parallel or close to parallel to the plates 32, and the liquid crystal 42, which is aligned with respect to the applied field from the bias source 36, tends to be oriented in a somewhat diagonal or slanted configuration, as is seen in FIG. 2, for example, being a transition layer between the two layers of liquid crystal 41, 42.

The actual thickness of the respective layers of liquid crystal 41, 42 and 43 will be a function of the magnitude of electric field applied across the liquid crystal cell 30. The greater the field, the thicker will be the layer of liquid crystal 42 aligned with respect to the field and the thinner will be the layers of liquid crystal 41, 43. Indeed, in the optimal case, in response to a maximum electric field that is not too great as to burn through the cell, all liquid crystal in the cell would tend to align in parallel with respect to the field. In practicality, that liquid crystal which is immediately adjacent the plates 32 will tend not to align with respect to the field or, in any event, will still maintain a component of alignment that is in parallel with the plates. Thus, the layer of liquid crystal 43 that is sloping also may not be able to be totally aligned with respect to the applied electric field but may be substantially aligned so as to minimize the amount of light transmission therethrough across the optical axis thereof.

As light is transmitted through liquid crystal that is oriented such that the light crosses the optical axis thereof, the liquid crystal tends to slow one of the quadrature components of the transmitted light relative to the other quadrature component. The larger the thickness of such liquid crystal layer through which the light is transmitted, the larger will be the relative phase retardation. Therefore, in the absence of an applied electric field other than that which aligns the liquid crystal 42 near the center of the cell 30, substantial phase retardation will occur for light transmitted through the cell. In response to application of a maximum electric field, e.g., with the maximum voltage applied by the sources 36, 38, the phase retardation will be minimized.

Several advantages inure to the use of the surface mode liquid crystal cell 30 in the present invention. Such cell can be readily controlled as a function of voltage to alter phase retardation or phase separation characteristics of the extraordinary and ordinary quadrature light components of the transmitted light. Such cell is relatively fast acting since the majority of switching of liquid crystal alignment occurs relatively proximate the surfaces while that liquid crystal at and near the center of the cell remains biased to alignment according to the source 36. Further, since the cell can be relatively thick without sacrificing speed of response, problems of burn-out or burn through are minimized.

Figure 3:
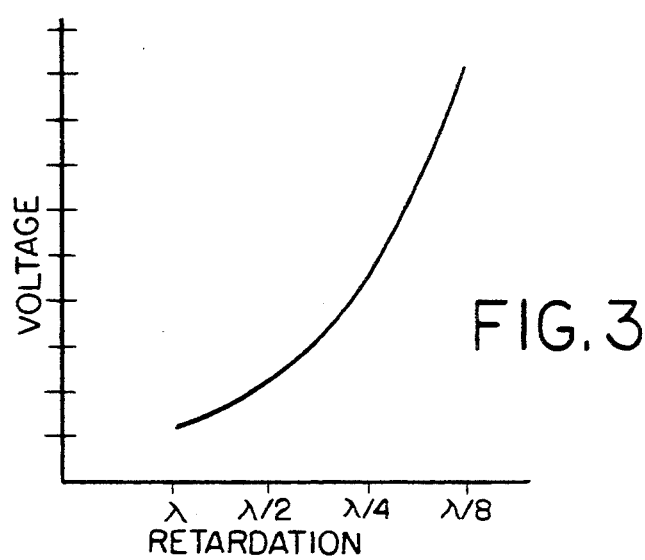
FIG. 3 is a graph of the retardation or phase difference of the quadrature components of polarized light able to be effected by the liquid crystal cell.

A graph showing the phase separation for the ordinary and extraordinary quadrature components of light transmitted through a variable retarder liquid crystal cell in response to applied electric field is shown in FIG. 3. As the field increases on the ordinate, the amount of retardation decreases on the abscissa, and the converse also is true.

Figure 4:
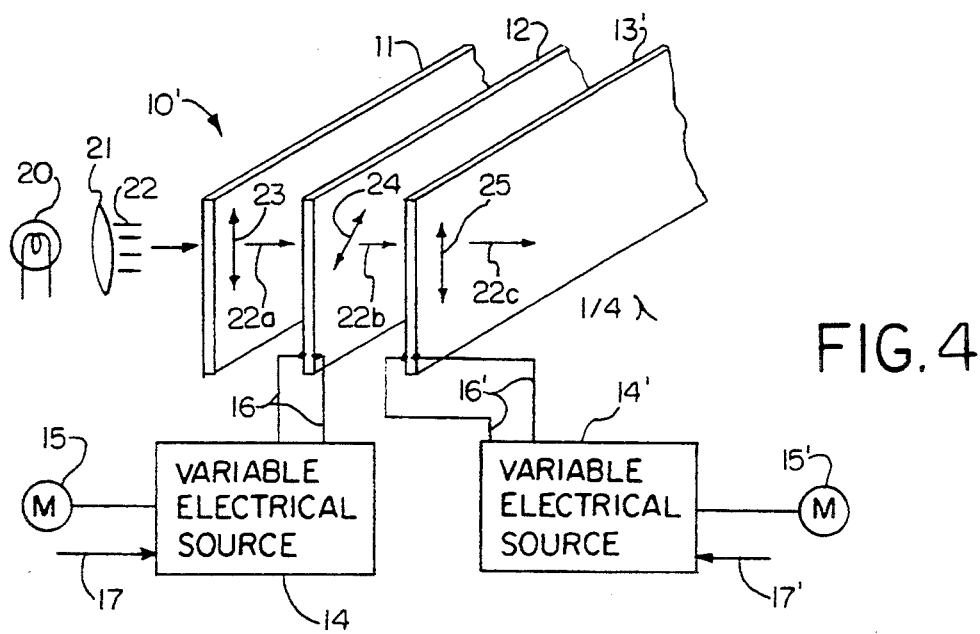
FIG. 4 is a schematic illustration similar to FIG. 1 showing a modified apparatus for rotating polarization of polarized light.

Briefly referring to FIG. 4, a modified apparatus for rotating polarization of polarized light is generally designated 10'. The apparatus 10' is similar to the apparatus 10. Various parts that are the same in the apparatus 10' and 10 are identified by the same reference numeral. Such parts operate identically as was described above. Parts designated by primed reference numerals are similar, but not identical, in form and function to parts designated by the same unprimed reference numerals. (The same is true with respect to the other figures hereof.)

Uniquely, though, in the apparatus 10' the analyzing component or plate 13', which generally corresponds to the quarter wave plate 13 of FIG. 1, is a variable device that is able to be tuned to provide quarter wave plate function with respect to respective wavelengths of light 22 generated by the source 20. More specifically, the effective optical thickness of the analyzing device 13' can be changed so that for the particular wavelength of the light from the source 20, such analyzing device, in fact, is a quarter wave plate. Therefore, as a function of the wavelength of the light from the source 20, the analyzing device 13' can be tuned such that in response to incident light 22b that is circularly polarized, the light 22c will be linearly polarized and will have a plane of polarization that is parallel to the axis 23 of the linear polarizer 11.

An exemplary tunable analyzing device 13' may be, for example, a further variable retarder that is substantially the same as the variable retarder 12 described above in detail with respect to FIGS. 1-3. A variable electrical source 14' provides a voltage on leads 16' to such a variable retarder analyzing device 13' to affect alignment of liquid crystal therein in the manner described above with respect to FIG. 2 in particular. As the voltage and, thus, the electric field is increased, the amount of retardation and, thus, the effective optical thickness or phase retarding thickness of the analyzing device 13' is reduced. As the voltage is decreased, the optical thickness or phase retarding thickness increases. By changing such effective thickness of the analyzing device 13' the analyzing device 13' can be tuned to be a true quarter wave plate for the particular wavelength of light from the source 20 being transmitted through the apparatus 10'. A manual or electronic input 17' may be provided to the source 14' to adjust the analyzing device 13'. A meter or other indicator 15' may be used to indicate the voltage being applied to the analyzing device 13', the effective optical/phase retarding thickness thereof, and/or the wavelength of light for which such device is tuned to be a quarter wave plate.

Figure 5:
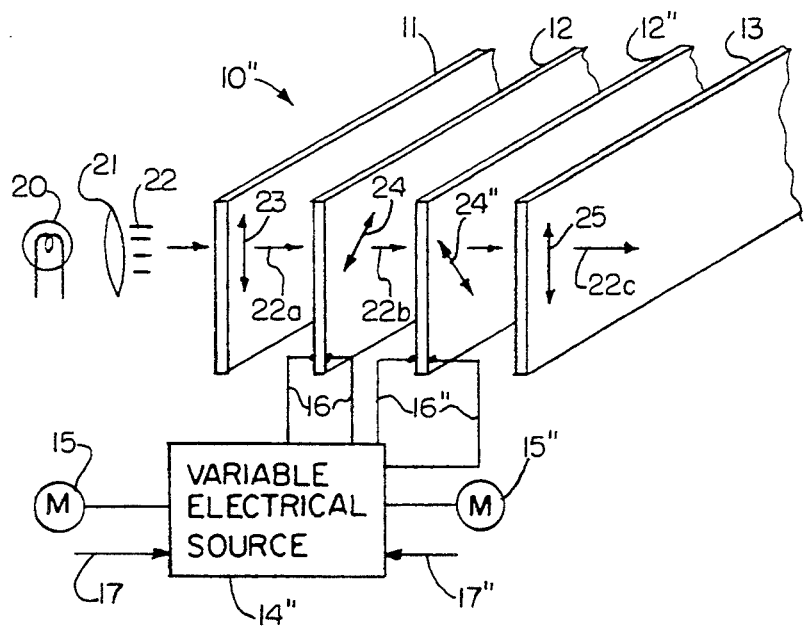
FIG. 5 is a schematic view of a further embodiment of apparatus for rotating polarization of polarized light using plural variable retarders in optical series and push-pull relation.

Referring to FIG. 5, another embodiment of apparatus 10" for rotating polarization of polarized light is illustrated. The apparatus 10" is similar to the apparatus 10 described above except that a second variable retarder 12" which is identical to the variable retarder 12, is employed in the path of light transmitted through the apparatus 10. Moreover, the variable electrical source 14" may be similar to the source 14 described above with reference to FIG. 1, although such source 14" preferably has the capability of providing different respective voltages on lines 16 and 16" to the respective retarders 12, 12". Such voltages may be changed individually and need not be related to each other. Such changes may be in response to inputs provided at 17, 17" and the magnitudes of the voltages and/or the effects thereof may be displayed on meters or indicators 15, 15", as was described above.

Most preferably, though, the source 14" provides the same bias voltage 36 (FIG. 2) to each retarder 12, 12" and respective AC signals 38 (FIG. 2) that are the same frequency and amplitude and either the same phase or phase separated by 180 degrees; however, the retarders are switched on and off in an out of phase fashion so as to operate in push-pull manner, e.g., similar to the operation of a push-pull amplifier. Such push-pull operation is disclosed in the above U.S. reissue patent, which is incorporated by reference. It has been found that such push-pull operation using two retarders increases the speed, accuracy and linearity of the retardation effected by the retarder pair relative to that of a single retarder 12, for example.

Figure 6:
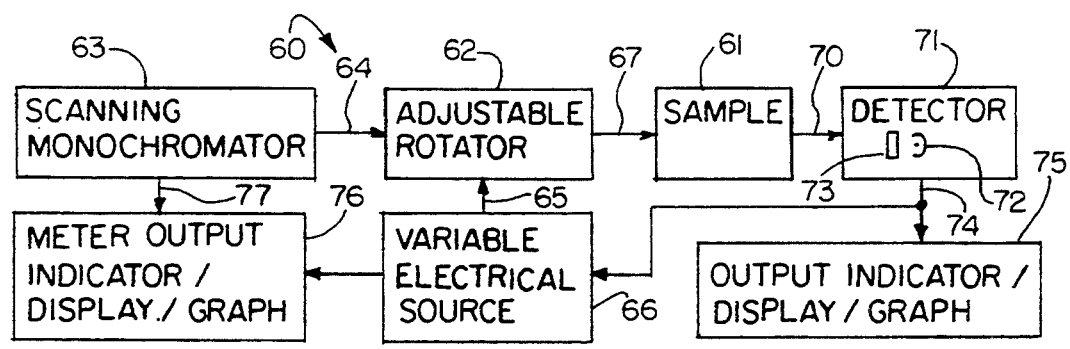
FIG. 6 is a schematic block diagram of an apparatus for detecting the optical activity of a specimen.

In FIG. 6 an apparatus 60 for detecting the optical activity of a sample 61 by using an adjustable rotater 62, which rotates the polarization of polarized light in the manner described above with reference to FIGS. 1 through 5, for example, is illustrated. The optical activity of the sample 61 may be used to identify the sample and/or the concentration of a particular ingredient in the sample, e.g., as in a sacharimeter used to detect the presence and concentration of sugar in a specimen. Optical activity here is intended to mean the ability of the sample to rotate polarization of light transmitted through the sample. The amount of rotation may be representative of the existence and/or concentration of a particular ingredient in the sample. The nature of the sample, for example, that material of which the sample is constituted, also may be detected or determined as a function of the wavelength or wavelengths of light that in fact are rotated by the sample and/or the amount of such rotation. The apparatus 60 is useful to detect such characteristics of the sample 61, as now will be described.

The sample 61 may be, for example, a container for holding a fluid sample or a solid sample, or if the sample is self-supporting, no container may be needed. An exemplary sample may be sugar in water. Another sample may be urine, which is intended to be tested for certain components, such as for drug analyses, sugar, etc. Other samples also may be used.

Apparatus 60 includes a scanning monochromator light source 63. Such light source 63 produces output light 64 that has a selectable wavelength. An adjustable rotater 62 receives the light 64, polarizes that light, and rotates the plane of polarization according to a variable voltage applied at 65 from a variable electrical source 66. Thus, light 67 output from the rotater 62 is linearly polarized and has a plane of polarization determined by the voltage applied at 65 to the rotater 62. The light 67 is directed to and through the sample 61. Light 70 from the sample 61 is directed to a detector 71.

The detector 71 preferably includes a photosensitive device, such as a photocell, photosensitive diode, photosensitive transistor, etc., indicated at 72. The detector 71 also preferably includes an analyzer or analyzing device 73. Such analyzer 73 may be, for example, a linear analyzer, i.e., a device that transmits light when the plane of polarization thereof is parallel to the axis of polarization of the analyzer and blocks light that has a plane of polarization which is perpendicular to the axis of polarization of the analyzer 73.

The output 74, for example, in the form of a voltage or current, is directed to an output indicator, display or graph-type device 75, which displays the magnitude of the output from the photosensitive device 72 that in turn is a function of the intensity of light impinging thereon.

Figure 7:
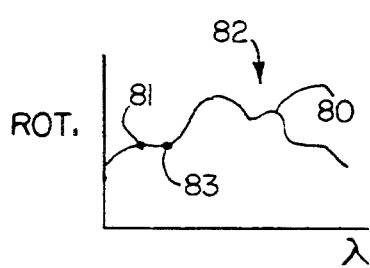
FIG. 7 is a graph representing the optical activity determined by the apparatus of FIG. 6.

The output 74 also may be directed to the variable electrical source 66 and used as a control therefor to cause the variable electrical source to produce a voltage at 65 to cause a predetermined rotation by the rotater 62. A meter or output indicator, display, and/or graph 76 also is coupled to the variable electrical source 66 to display the voltage applied thereby to the rotater 62. Moreover, the scanning monochromater 63 may be coupled to the meter/output device 76 so that such device can produce an output curve, such as that depicted at 80 in FIG. 7, which is a function of the wavelength of the light 64 produced by the scanning monochromater 63.

In operation of the apparatus 60, the scanning monochromater 63 produces a light output 64 at a particular wavelength. The nature of that light output is input by the connection 77 to the meter/output device 76. The adjustable rotater 62, such as the apparatus 10' of FIG. 4, produces linearly polarized light 67 that has a plane of polarization which is a function of the voltage applied at 65 from the source 66 to the rotater 62. The sample 61 rotates the plane of polarization of the light 67 incident thereon and produces light 70 that has a plane of polarization which is rotated as a function of the optical activity of the sample 61. Preferably, the variable electrical source 66 is adjusted manually or automatically, the latter by virtue of the connection 74 to the output from the detector 71, so as to cause the output from the detector 71 to be a maximum or a minimum. If a maximum, then the plane of polarization of the light 70 should coincide with the polarization axis of the analyzer 73. If a minimum, the plane of polarization of the light 70 should be perpendicular to the axis of polarization of the analyzer 73. A person operating the apparatus 60 may monitor the magnitude of the output 74 from the detector 71 by observing the output device 75 and may in turn manually adjust the variable electrical source 66 to achieve the desired minimum or maximum output. If the variable electrical source 66 is to respond automatically to the output 74 from the detector 71, then such source may include various ramp and other circuits of conventional design, including, for example, feedback and/or servo-type circuits, that adjust the voltage 65 to the rotater 62 to achieve the desired maximum or minimum conditions described. Most preferably a minimum or null detection should be used.

When the desired maximum or minimum condition is achieved, the meter/output device 76 may be signaled by the source 66, for example, or may have circuitry that detects a characteristic, such as a continued constant output from the source 66, thus indicating that the apparatus 60 has stabilized at a maximum or minimum output of the detector 71 for the particular wavelength of light 64 then being produced by the monochromater 63. At that moment, the meter/output device 76 may plot a point, such as point 81 on the graph 82 of which the curve 80 is a part to indicate that for the given wavelength a null was achieved for a particular source 66 voltage (which also is representative of rotation of the polarization of the light by the rotater). Thereafter, the scanning monochromater 63 may produce light 64 of a different wavelength, and the just-described process is repeated to derive a subsequent point 83 on the curve 80, and so on, until the entire curve 80 is obtained.

A computer may be used to effect automatic control of the various functions, operations and features of the apparatus 60 just described. Other automatic mechanisms also may be used. The resulting curve 80 may be used to identify the nature of the sample 61, including, for example, the material of which the sample is formed and/or concentration characteristics.

A modification that may be made in the apparatus 60 is the exchanging of the locations of the adjustable rotater 62 and the analyzer 73. For example, the analyzer may be placed directly in the path of the light 65 to illuminate the sample 61 with linearly polarized light;

and the adjustable rotator 62 may be placed in the detector 71 adjacent the photosensitive device 72. Operation of such a modified apparatus 60 would be according to the description above.

It is noted, too, that the light source 20 in the several embodiments may be replaced by a laser. Since a laser produces light that is linearly polarized, in such case the linear polarizer 11 may be eliminated.

Figure 8:
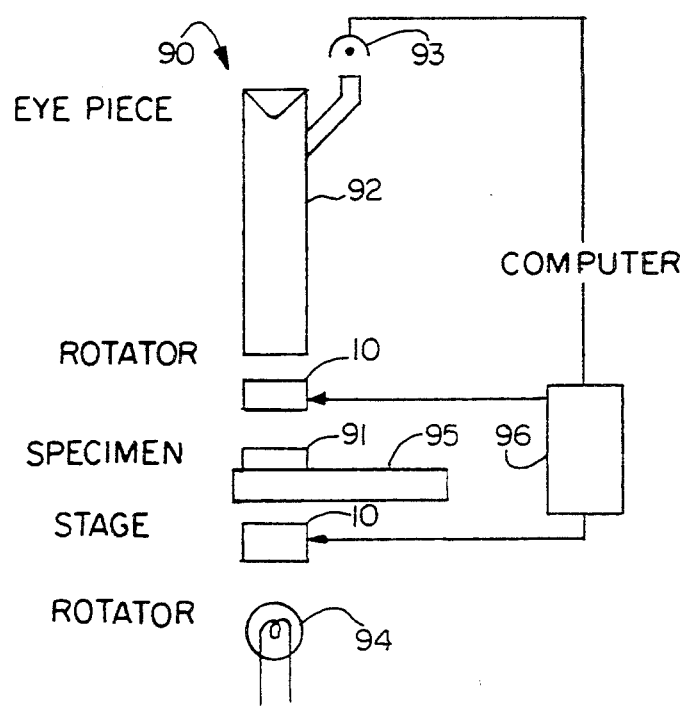
FIG. 8 is a schematic illustration of a polarizing microscope system using the variable rotator of the present invention.

The rotators 10, 10', 10" of the invention also may be used in a polarizing microscope 90 illustrated in FIG. 8. In such case the rotator 10, for example, may be placed in the path of light from the specimen 91 to the eyepiece 92 (or detector 93) of the microscope 90 and/or may be in the path of light from the illuminating light source 94 to the specimen 91. The illuminating source may be directed at the specimen 91 from below the stage 95 for transmission or from above the stage for reflection examination of the specimen. A computer 96 may be coupled to the rotator 10 to rotate the plane of polarization of light transmitted therethrough. The computer may be programmed in conventional manner to provide an input to the rotator 10 that continuously cyclically rotates the plane of polarization as a function of time. For example, one full rotation could occur in, say, one millisecond. The detector 93 may be a photosensitive device, possibly also with an analyzer (linear polarizer, for example) and may be coupled to the computer to indicate the intensity or other characteristic of light incident thereon. The computer 96 may produce output information describing the detected detector output as a function of time and, thus, of the direction of polarization as effected by the rotator 10.

I claim:

1. Apparatus for continuously rotating polarization of polarized light, comprising:
   input means for furnishing linearly polarized input light which has a plane of polarization in substantially only one direction,
   variable retarder means for retarding the phase of one quadrature component of such linearly polarized input light an amount relative to the phase of the other quadrature component, said variable retarder means comprising a liquid crystal cell operative to respond to a continuously varying electric field thereby continuously to vary the amount of relative retardation, said variable retarder means having an optical axis, and
   analyzing means for converting such quadrature components to linearly polarized light having a plane of polarization that is dependent on the amount of such phase retardation, said analyzing means comprising a quarter wave plate, said quarter wave plate being tunable to provider quarter wave function with respect to the wavelength of light incident thereon, said quarter wave plate having an optical axis, and said optical axis of said quarter wave plate being oriented substantially in parallel with the direction of polarization of said linearly polarized light and at substantially 45 degrees relative to the optical axis of said variable retarder means.

2. The apparatus of claim 1, said input means comprising means for collimating light.

3. The apparatus of claim 1, said input means comprising a light source for producing light in the visible spectrum.

4. The apparatus of claim 1, said input means comprising a linear polarizer.

5. The apparatus of claim 1, said retarder means comprising means for separating incident linearly polarized light to ordinary and extraordinary components and for retarding the phase of one component relative to the other.

6. The apparatus of claim 1, said input means comprising a linear polarizer having an axis of polarization, and said retarder means having an optical axis that is oriented at 45 degrees relative to such axis of polarization.

7. The apparatus of claim 1, further comprising further input means for altering the retardation effected by said variable retarder means, said further input means comprising means for supplying electrical input to said variable retarder means.

8. The apparatus of claim 7, said variable retarder means comprising a surface mode liquid crystal cell, and said input means comprising means for varying the electric field applied across the liquid crystal of said cell to alter the retardation effected on light transmitted therethrough.

9. The apparatus of claim 1, said tunable quarter wave plate comprising a variable retarder including a surface mode liquid crystal cell to alter the effective thickness thereof in response to a prescribed input thereto, thereby to alter the retardation effected on light transmitted therethrough.

10. The apparatus of claim 1, further comprising a further variable retarder means in optical series relationship with said variable retarder means for increasing the accuracy of phase retardation of one quadrature component relative to the other.

11. The apparatus of claim 1, said retarder means comprising means for separating incident linearly polarized light to ordinary and extraordinary components and for retarding the phase of one component relative to the other; said input means comprising a linear polarizer having an axis of polarization, and said retarder means having an optical axis that is oriented at 45 degrees relative to such axis of polarization.

12. The apparatus of claim 11, said analyzer means comprising a quarter wave plate having an axis that is oriented in parallel with the axis of polarization of said linear polarizer.

13. Apparatus for rotating polarization of polarized light, comprising:
   input means for furnishing linearly polarized input light at one or more wavelengths and having a plane of polarization in substantially only one direction,
   variable retarder means for retarding the phase of one quadrature component of such linearly polarized input light an amount relative to the phase of the other quadrature component, said variable retarder means having an optical axis, and
   analyzing means for converting such quadrature components to linearly polarized light having a plane of polarization that is a function of the amount of such phase retardation,
   said analyzing means comprising a quarter wave plate, and said quarter wave plate being tunable to provide quarter wave function with respect to the particular wavelength of light incident thereon, said quarter wave plate having an optical axis, and said optical axis of said quarter wave plate being oriented substantially in parallel with the plane of polarization of said linearly polarized light and at substantially 45 degrees relative to the optical axis of said variable retarder means.

14. The apparatus of claim 13, said tunable quarter wave plate comprising a variable retarder including a surface mode liquid crystal cell to alter the effective thickness thereof in response to a prescribed input thereto, thereby to alter the retardation effected on light transmitted therethrough.

* * * * *